United States Patent [19]
Sondergaard et al.

[11] Patent Number: 6,014,983
[45] Date of Patent: Jan. 18, 2000

[54] STOP VALVE

[75] Inventors: Bjarne Sondergaard, Kolding; Per Schneiderreit, Vamdrup; Jensen Karl-Age Lindholm, Odense, all of Denmark

[73] Assignee: Alfa Laval LKM A/S, Kolding, Denmark

[21] Appl. No.: 09/091,089

[22] PCT Filed: Sep. 12, 1996

[86] PCT No.: PCT/EP96/03998

§ 371 Date: Jun. 11, 1998

§ 102(e) Date: Jun. 11, 1998

[87] PCT Pub. No.: WO97/24541

PCT Pub. Date: Jul. 10, 1997

[30] Foreign Application Priority Data

Dec. 27, 1995 [DE] Germany .......................... 195 48 860

[51] Int. Cl.[7] .............................. F16K 11/20; F16K 51/00
[52] U.S. Cl. ..................... 137/312; 137/240; 137/614.18
[58] Field of Search ................................... 137/312, 240, 137/614.11, 614.17, 614.18, 614.19, 614.16; 134/166 C, 166 R

[56] References Cited

U.S. PATENT DOCUMENTS

| | | | |
|---|---|---|---|
| 4,304,251 | 12/1981 | Schadel et al. | 137/312 |
| 4,373,545 | 2/1983 | Knappe | 137/312 |
| 4,436,106 | 3/1984 | Tuchenhagen et al. | 137/240 |
| 4,460,014 | 7/1984 | Mases et al. | 137/240 |
| 4,605,035 | 8/1986 | Rasmussen et al. | 137/312 |
| 4,617,955 | 10/1986 | Melgaard | 137/312 |
| 4,655,253 | 4/1987 | Ourensma | 137/312 |
| 4,687,015 | 8/1987 | Mieth | 137/240 |
| 4,757,834 | 7/1988 | Mieth | 137/240 |
| 5,645,102 | 7/1997 | Brackelmann et al. | 137/312 |
| 5,699,825 | 12/1997 | Norton | 137/312 |
| 5,904,173 | 5/1999 | Ozawa | 137/312 |

FOREIGN PATENT DOCUMENTS

| | | | |
|---|---|---|---|
| 0 174 384 | 9/1984 | European Pat. Off. | 137/213 |
| 27 50 833 | 5/1979 | Germany | 137/312 |
| 30 05 329 | 8/1981 | Germany | 137/312 |
| 31 33 273 | 3/1983 | Germany | 137/312 |
| 42 36 464 C2 | 8/1995 | Germany . | |

Primary Examiner—Henry Bennett
Assistant Examiner—Joanne Y. Kim
Attorney, Agent, or Firm—Michael J. Striker

[57] ABSTRACT

The invention relates to a double seat valve in which it is possible to clean an upper valve seat and a lower valve seat separately. To that end, a cylinder is provided as the drive mechanism, which in contrast to the prior art makes do with only three pistons. Nevertheless, in the cleaning stroke additional closing force can be brought to bear on a valve plate that is closed in that process.

9 Claims, 1 Drawing Sheet

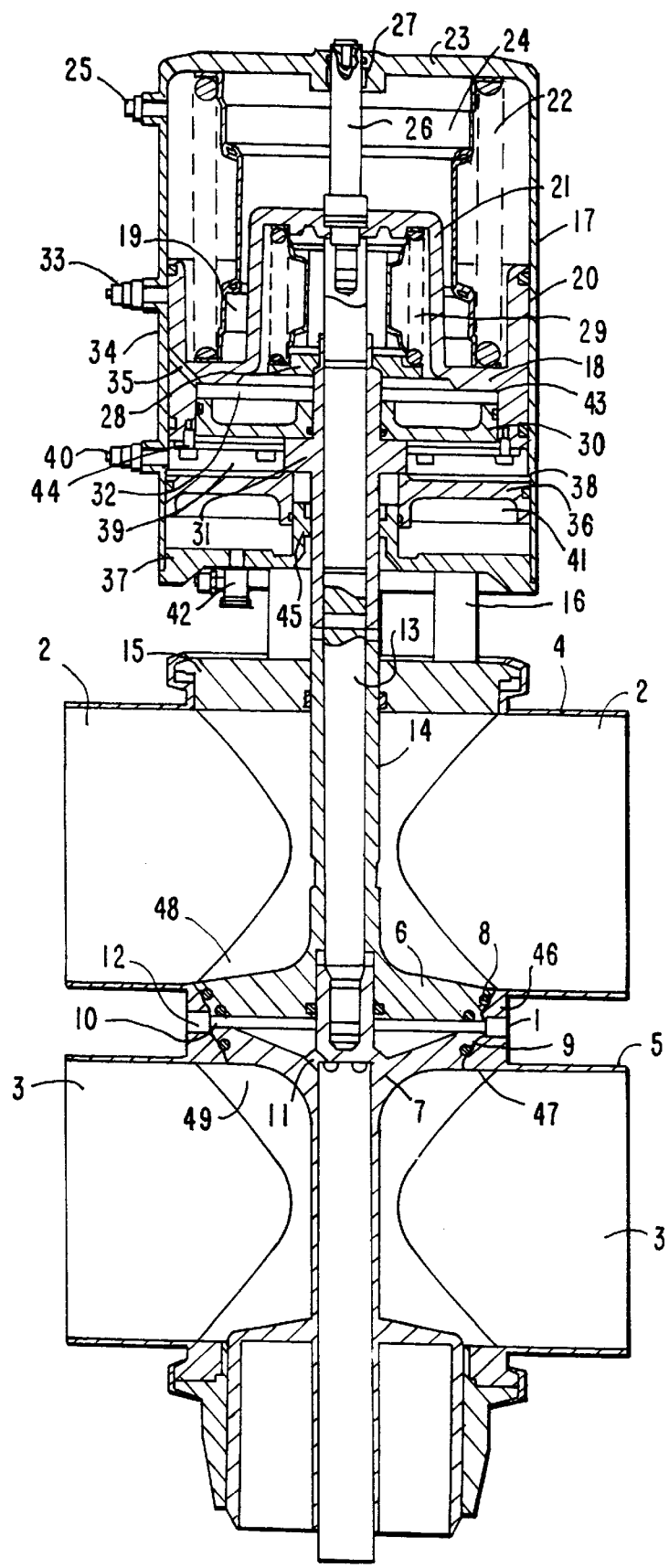

STOP VALVE

A double seat valve with leakage protection, in particular for the food and beverage industry, which in its housing has two cooperating valve plates, which define a hollow leakage chamber that typically opens into the open air via lines, wherein for actuating both valve plates, one common drive is provided, which includes a cylinder with a first work piston, loaded on both sides by compression springs and being fixedly connected to the valve shaft of the lower valve plate, wherein this valve shaft passes in telescoping fashion through the upper valve plate and its tubular shaft, which in turn protrudes with its upper end into the cylinder and there carries an abutment for the lower compression spring that presses the upper valve plate into its seat, while the upper compression spring, which is braced by its upper end on the upper cylinder cap, presses the lower valve plate against its valve seat, and a second work piston, acting on the tubular shaft, is disposed in the cylinder below the first work piston, and a third work piston which is movable on the tubular shaft is disposed between the first and second work pistons, wherein the third work piston is sealingly surrounded on its circumferential surface by the first work piston, and the first and third work pistons are embodied as displaceable relative to one another.

A stop valve of this same generic type is known from German Patent Disclosure DE 42 36 464 A1. The seat faces of the two valve plates are embodied conically and are oriented in such a way that the two valve plates move in the same direction into the seat face. Between the valve plates, a leakage chamber is formed, which via a line typically discharges into the open air. This reliably prevents any mixing of media. In the closed state, the upper valve plate is pressed by the pressure of the medium more firmly into its valve seat, while the lower valve plate is relieved. To prevent pressure surges from raising the lower valve plate and allowing medium to pass into the leakage chamber, the lower valve plate is extended downward in the form of a compensation piston, which has approximately the same diameter as the lower valve plate. Pressure surges in the pipeline thus act with the same force on the compensation cylinder and on the valve plate, so that the pressure forces in the axial direction compensate for one another.

The valve can perform three functions. For opening the valve, the two valve plates are raised; for cleaning the valve seats, the lower and upper valve plates can each be raised slightly, individually. To that end, the valve is equipped with a cylinder, which has four pistons. The work pistons act on the two valve plates via two concentrically disposed valve shafts. For opening, a first work piston is raised by compressed air until it strikes a second piston, which is connected via its valve shaft to the lower valve plate. The first and second pistons are raised farther, carrying the lower valve plate along with them, until the lower valve plate strikes the upper valve plate. The leakage chamber is now closed. On being raised further, the two valve plates move together upward, thereby opening the valve. The closure of the valve proceeds in the reverse order of work steps. For cleaning the valve seats, the valve plates must be raised individually. To that end, a third and fourth piston are provided, which act on the lower and upper valve plate, respectively, via their valve shafts. The third piston is located between the second piston and the lower housing wall of the cylinder. If it is acted upon by compressed air on its underside, it is raised slightly, until it strikes against an abutment. Via the associated valve shaft, the upper valve plate is raised somewhat from its seat. The medium can pass through an annular gap between the valve plate and the valve seat into the leakage chamber. This increases the pressure on the lower valve plate, thus pressing it more firmly into its seat.

For cleaning the upper valve seat, the fourth piston, which is located between the first piston and the upper housing wall of the cylinder, is subjected from below to compressed air. The piston is raised until it strikes against the upper cylinder wall. Via a valve shaft, the lower valve plate is thereby raised somewhat from its seat as well. The entering medium reducing the contact pressure of the upper valve plate against its associated valve seat. To prevent the upper valve plate from being raised by the entering medium, the first piston is likewise acted upon by compressed air on its top side, via a connecting line. Via the associated valve shaft, pressure is exerted on the upper valve plate, thus pressing it more firmly into its valve seat.

The construction of the drive mechanism proves to be quite complicated because of the many switching functions.

The object of the invention is to refine a double seat valve of this generic type with its drive mechanism in such a way that it is simplified in its mechanical design and has a lower structural height.

This object is attained in that by the first work piston and the third work piston a second work chamber is formed, which is embodied such that it can be subjected to compressed air via a conduit, and the first work piston has a first abutment and a second abutment, which limits the stroke of the third work piston.

In this way, for cleaning the lower valve seat it is possible to dispense with a special work piston for raising the lower valve plate. The number of moving parts of the valve is reduced. In contrast to the drives previously used for double seat valves, the double seat valve of the invention accordingly needs only three pistons instead of four, to be able to reliably perform all the desired functions, namely, opening, closing and cleaning of the valve seats. At the same time, an advantageously lower structural height for the cylinder is obtained.

Because the second abutment of the first work piston is mounted on the underside thereof, preferably by means of a releasable connection, assembly during production is made easier. Maintenance of the valve is correspondingly simplified. For maintenance purposes, the two work pistons can be removed very easily.

The upper valve plate can be press-fitted into its valve seat at increased pressure during cleaning of the lower valve seat, by the provision that the conduit for imposing the compressed air is extended from the second work chamber through the first work piston.

Subjecting the second work chamber to the pressure medium, typically air, raises the first work piston upward, until its abutment comes into contact with the third work piston. The first and third work pistons now virtually form a rigid unit. As a result, via the tubular valve shaft of the upper valve plate, associated with the third work piston, is press-fitted into its valve seat by the force of the compression spring, which is shortened by the stroke of the first work piston.

To supply the second work chamber with pressure medium, it is provided that a delivery conduit, into which the conduit discharges, is embodied between the circumferential face of the first work piston and the cylinder. In this way, a firm connection for the pressure medium is made possible even during the lifting motion of the first work piston.

Production of the drive becomes even simpler if the stroke of the second work piston is limited by an abutment, which is preferably provided in the wall of the cylinder.

A first pressure chamber, formed by the upper cylinder cap, the cylinder, and the first work piston, has a compressed air connection by way of which the first pressure chamber can be subjected to a pressure medium, preferably compressed air. In this way, the force with which the upper valve plate is pressed into its valve seat during the cleaning of the lower valve seat can be increased still further. The pressure in the first work chamber should not exceed 50% of the pressure prevailing in the second work chamber. At a higher pressure, the first work piston moves downward, and the lower valve plate moves back into its seat.

Since at least one of the valve plates has a throttle edge preferably protruding into a through opening of the valve seat, a steep rise in pressure in the leakage chamber during the opening motion of the valve plates is averted. Because of the lower inflow speed of the medium into the leakage chamber, the seals at the valve plates are also less severely stressed.

A reliable movement of the valve plates into the valve seats is attained if the valve plates are preferably conical, and the throttle edge is embodied as a terminal edge of a formed-on cylindrical surface, whose height preferably exceeds the length of a cleaning stroke. By means of the cylindrical throttle edges, the valve plate on moving into the valve seat first undergoes guidance, and as a result of the conical shape of the valve plates, the valve plates center themselves automatically on moving into the valve seat. Seizing of the valve plates and valve seats is virtually precluded as a result. For cleaning of the sealing face, the valve plate can be raised by a small amount. Over the course of this cleaning stroke, the throttle gap that forms in the process remains constant, since the height of the cylindrical face formed on exceeds the length of the cleaning stroke.

A pressure rise in the leakage chamber during cleaning of the valve seats is avoided in that a throttle gap formed by the throttle edge (46, 47) and the through opening (48, 49) has a smaller flow area than the total area of the lines (11) that typically discharge into the open air from the hollow leakage chamber.

The invention will be described in terms of a preferred embodiment in conjunction with a drawing, and further advantageous details can be learned from the sole drawing FIGURE.

This FIGURE schematically shows a vertical section through the double seat valve of the invention, in the position of repose. In FIG. 1, the double seat valve comprises an annular line-connecting housing part 1 with valve seats 8 and 9. The liquid-tight closure between an upper housing part 4 with line connections 2 and the lower housing part 5 with line connections 3 is made by means of an upper valve plate 6 and a lower valve plate 7. In the closing positions, these valve plates are seated respectively in the upper valve seat 8 and the lower valve seat 9. Between the two valve plates 6, 7, in the closing position shown, a leakage chamber 10 forms. Bores 11, which lead to a leakage outlet, are provided in the lower valve plate 7. Via a connection 12 provided in the connecting housing part 1, the leakage chamber 10 can be supplied with cleaning agent for cleaning purposes, which then flows out into the open via the bores 11 in the lower valve plate 7 to the leakage outlet. In other installation locations, the connection can also take on other functions. If in an exceptional case liquid penetrates the leakage chamber 10 via the valve seat 8 or 9, it is likewise carried away into the open through the bores 11.

Mixing of the liquids that are located in the upper valve housing 4 and the lower valve housing 5 is thus reliably prevented.

The lower valve plate 7 is firmly connected to a valve shaft 13, while the lower valve plate 6 is firmly connected to a tubular valve shaft 14, which in turn is supported, axially displaceably in telescoping fashion, on the valve shaft 13. Via spacer elements 16, a cylinder 17 is connected to an upper valve cap 15, which closes the upper housing part 4.

A first work piston 18 is solidly mounted on the axially movable valve shaft 13, the first work piston 18 is cup-shaped in its lower portion. With its outer circumferential face, it is sealingly flush with the inner housing wall of the cylinder 17.

An upper portion of the piston 18 has an annularly encompassing indentation 19, which is defined on the outside by a piston wall 20. Supported in the indentation 19 is a compression spring 22, which is based by its opposite end on the upper housing wall 23 of the cylinder 17. In this way, the prestressed compression spring 22 acting on the first work piston 18 presses the lower valve plate 7 firmly against the valve seat 9, via the valve shaft 13. Because of the piston wall 20, the piston 18 is given guidance over a long distance, without disadvantageously affecting the structural height.

On the opposite side of the indentation 19, the first work piston 18 has a cup-shaped portion 21, in which a spring 29 is received. This prestressed second compression spring 29 is supported by its upper end in the region of the portion 21 on the first work piston 18 and by its other end on an abutment disk 28, which is secured to the tubular valve shaft 14. The force of the spring 29, via the abutment disk 28 and the tubular valve shaft 14, presses the upper valve plate 6 against its valve seat 8.

In this way, the valve is closed without pressure.

The pressure chamber 24, formed by the cylinder 17, an upper cylinder cap 23 and the first work piston 18, can be subjected to compressed air via the connection 25. In this way, the first work piston 18 can be pressed downward by an additional means to the spring force of the compression springs 22.

Above the first work piston 18, the valve shaft 13 is extended in an extension 26. This extension is guided in sealed fashion through an opening 27 through the upper housing wall 23 of the cylinder and thus undertakes an additional guidance function for the valve shafts and the work pistons. Moreover, by this means, the instantaneous switching state of the valve can immediately be detected visually from outside.

In a lower portion, the first work piston 18 receives a third work piston 30. The third work piston 30 is movably supported on the tubular shaft 14. In the position of repose shown in the drawing, it rests on an abutment 31, embodied as an annular shoulder of the tubular valve shaft 14. The first and third work pistons 18, 30 form a second work chamber 32, which can be subjected to compressed air via a connection 33, a conduit 34, and a bore 35. Located below the first work piston 18 in the cylinder 17 is the second work piston 36, which is supported on a tubular cuff 45 of the lower valve cap 37. Its stroke is limited by the lower cylinder cap 37 and by a stop 38 formed in the cylinder housing wall.

A third pressure chamber 39 is formed between the second work piston 36 and the first and third work pistons 18, 30 and can be subjected to compressed air via a connection 40.

Located between the lower cylinder cap 37 and the second work piston 36 is a fourth pressure chamber 41, which can be subjected to compressed air via a connection 42.

The valve is opened by switching compressed air to the connection 40. As a result of the increase in pressure in the third pressure chamber 39, first the third work piston 30 on the tubular shaft 14 is moved upward, until it strikes an abutment face 43 of the first work piston. The first and third work pistons thereupon rise together farther, and as a result via the valve shaft 13 the lower valve plate 7 is raised until it contacts the upper valve plate 6. The leakage chamber 10 is then closed. The contacting faces of the valve plates are pressed together by the spring 29. The first and third work pistons 18, 30 then move together farther upward, carrying the upper and lower valve plates 6, 7 with them, until the valve is completely opened. During the stroke, the spring 22 is compressed.

The closing operation proceeds in reverse order. Via the connection 40, the third work chamber 39 is vented. After that, the first and third work pistons 18, 30 descend until the upper valve plate 6, via the tubular valve shaft 14, is pressed by the spring 22 into the upper valve seat 8. The lower valve plate 7 moves farther downward under the pressure of the springs, until it reaches its lower valve seat 9 and there is pressed inward via the shaft 13 by the spring 29. Upon closing, the spacing between the upper valve plate 6 and the lower valve plate 7 is thus resumed, so that the leakage chamber 10 is again created between the two valve plates 6, 7. The third work piston 30 is separated from the first work piston 18 in the process, and in the pressureless state rests again on the shoulder 31.

The upper and lower valve plates each have respective throttle edges 46, 47, and the diameter of the surface formed by the throttle edges 46, 47 is less than the diameter of the flow openings 48, 49. The diameters are selected such that the area of the annular throttle gap formed by the throttle edges 46, 47 and flow openings 48, 49 is less than the area of the bores 11.

For cleaning the lower valve seat 9, the lower valve plate can be raised individually. Compressed air is applied to the connection 33. The pressure in the second pressure chamber 32 rises via the conduit 34 and the bore 35. Since the third work piston 30 is resting on the shoulder 31, the pressure drives the first work piston 18 upward, until its abutments 44 rest on the underside of the third work piston 30. The first and third work pistons 18, 30 now form a unit. The lower valve plate 7 has been slightly raised via the shaft 13.

Through the annular throttle gap between the valve plate 7 and the valve seat 9, medium from the lower housing part 5 can penetrate to the leakage chamber 10, and by this means, cleaning of the valve seat and the leakage chamber is effected. Via the bores 11, the medium is then carried away to the outside. Since the area of the annular throttle gap is less than the area of the bores 11, virtually no pressure rise in the leakage chamber 10 is caused by the entry of the medium during the cleaning. This arrangement of throttle edges and flow opening can be realized in other valve drives as well, independently of the valve drive of the invention.

In the event of blockage of the bores 11, for instance from foreign bodies, a pressure rise in the leakage chamber 10 does occur as a consequence of the entering medium. In that case, an increased force then acts on the upper valve plate in the opening direction of the valve. Since when pressure is imposed on the second work chamber 32, the first and third work pistons 18 and 30 virtually form a rigid unit, the upper valve plate is pressed into its valve seat 8 by the force of the compression spring 22, shortened by the stroke of the first work piston 18. The contact pressure of the upper valve plate 6 can be further increased by subjecting the first pressure chamber 24 to pressure in addition, via the connection 25. The pressure in the first pressure chamber 24 should not exceed 50% of the pressure prevailing in the second work chamber, because otherwise the first work piston 18 is moved downward, counter to the pressure prevailing in the second work chamber 32, and the valve is closed again.

The stroke for cleaning the upper valve plate 6 is initiated by applying compressed air to the connection 42. By the increased force in the fourth pressure chamber 41, the second work piston 36 is driven upward, until it contacts the abutment 31. The tubular shaft 14 is thereupon raised with the abutment 31, until the second work piston 36 strikes the abutment 38. This lifts the upper valve plate 6 slightly out of its valve seat 8. Through the throttle gap between the valve seat 8 and the valve plate 6, medium from the upper housing part 4 can now enter the leakage chamber 10, thereby bringing about cleaning of the valve seat. For lowering purposes, the fourth pressure chamber 41 is relieved, and as a result the second work piston 36 is lowered and the valve plate 6 is pressed back into its valve seat 8 by the spring 29, via the tubular shaft 14.

The mode of operation is summarized in the following table:

| Connection | 42 | 40 | 33 | 25 |
|---|---|---|---|---|
| Function: | | | | |
| Opening | 0 | L | 0 | 0 |
| Closing | 0 | 0 | 0 (L) | 0 (L) |
| Seat cleaning, upper | L | 0 | 0 | 0 |
| Seat cleaning, lower | 0 | 0 | L | 0 (L) |

Symbols:
L: subjected to pressure
0: pressureless

In this way, a valve is realized which without additional expense for circuitry and with an advantageously reduced number of mechanical components, the mixing, of media is reliably avoided in the cleaning mode as well.

LIST OF REFERENCE NUMERALS

1 Housing part
2 Line connection
3 Line connection
4 Upper housing part
5 Lower housing part
6 Upper valve plate
7 Lower valve plate
8 Upper valve seat
9 Lower valve seat
10 Leakage chamber
11 Bore
12 Connection
13 Valve shaft
14 Tubular valve shaft
15 Upper valve cap
16 Spacer elements
17 Cylinder
18 First work piston
19 Indentation
20 Piston wall
21 Cup-shaped portion
22 Compression spring
23 Upper cylinder cap
24 First pressure chamber
25 Compressed air connection
26 Extension
27 Opening
28 Abutment disk
29 Compression spring 30 Third work piston
31 Abutment
32 Second work chamber
33 Connection
34 Conduit
35 Bore
36 Second work piston
37 Lower cylinder cap
38 Stop
39 Third pressure chamber
40 Connection
41 Fourth pressure chamber
42 Connection
43 Abutment surface
44 Abutment
45 Cuff
46 Throttle edge
47 Throttle edge
48 Through opening
49 Through opening

We claim:

1. A double seat valve with leakage protection, in particular for the food and beverage industry, which in its housing has two cooperating valve plates (6, 7), which define a hollow leakage chamber (10) that typically opens into the open air via lines (11), wherein for actuating both valve plates (6, 7), one common drive is provided, which includes a cylinder (17) with a first work piston (18), loaded on both sides by compression springs (29, 22) and being fixedly connected to the valve shaft (13) of the lower valve plate (7), wherein this valve shaft (13) passes in telescoping fashion through the upper valve plate (6) and its tubular shaft (14), which in turn protrudes with its upper end into the cylinder (17) and there carries an abutment (28) for the lower compression spring (29) that presses the upper valve plate (6) into its seat (8), while the upper compression spring (22), which is braced by its upper end on the upper cylinder cap (23), presses the lower valve plate (7) against its valve seat (9), and a second work piston (36), acting on the tubular shaft, is disposed in the cylinder (17) below the first work piston (18), and a third work piston (30) which is movable on the tubular shaft is disposed between the first and second work pistons, wherein the third work piston (30) is sealingly surrounded on its circumferential surface by the first work piston (18), and the first and third work pistons are embodied as displaceable relative to one another, characterized in that by the first work piston (18) and the third work piston (30) a second work chamber (32) is formed, which is embodied such that it can be subjected to compressed air via a conduit (35), and the first work piston (18) has a first (43) and a second abutment (44), which limits the stroke of the third work piston (30).

2. The double seat valve of claim 1, characterized in that the second abutment (44) of the first work piston (18) is mounted on the underside thereof, preferably by means of a releaseable connection.

3. The double seat valve of claim 1 characterized in that the conduit (35) for imposing the compressed air is extended from the second work chamber (32) through the first work piston (18).

4. The double seat valve of claim 1, characterized in that a delivery conduit (34), into which the conduit (35) discharges, is embodied between the circumferential face of the first work piston (18) and the cylinder (17).

5. The double seat valve of claim 1, characterized in that the stroke of the second work piston (36) is limited by an abutment (38), which is preferably provided in the wall of the cylinder (17).

6. The double seat valve of claim 1, characterized in that a first pressure chamber (24), formed by the upper cylinder cap (23), the cylinder (17), and the first work piston (18), has a compressed air connection (25).

7. The double seat valve of claim 1, characterized in that at least one of the valve plates (8, 9) has a throttle edge (46, 47) preferably protruding into a through opening (48, 49) of the valve seat.

8. The double seat valve of claim 1, 7, characterized in that the valve plates (6, 7) are preferably conical, and the throttle edge (46, 47) is embodied as a terminal edge of a formed-on cylindrical surface, whose height preferably exceeds the length of a cleaning stroke.

9. The double seat valve of claim 1, or 8, characterized in that a throttle gap formed by the throttle edge (46, 47) and the through opening (48, 49) has a smaller flow area than the total area of the lines (11) that typically discharge into the open air from the hollow leakage chamber.

* * * * *